(12) United States Patent
Banipal et al.

(10) Patent No.: US 11,188,968 B2
(45) Date of Patent: Nov. 30, 2021

(54) COMPONENT BASED REVIEW SYSTEM

(71) Applicant: International Business Machines Corporation, Armonk, NY (US)

(72) Inventors: Indervir Singh Banipal, Austin, TX (US); Shikhar Kwatra, Durham, NC (US); Zachary A. Silverstein, Jacksonville, FL (US); Raghuveer Prasad Nagar, Kota (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/804,058

(22) Filed: Feb. 28, 2020

(65) Prior Publication Data
US 2021/0272177 A1    Sep. 2, 2021

(51) Int. Cl.
*G06Q 30/00* (2012.01)
*G06Q 30/06* (2012.01)
*G06Q 30/02* (2012.01)
*G06Q 10/10* (2012.01)
*H04L 29/08* (2006.01)
*G06N 3/02* (2006.01)
*G06F 40/20* (2020.01)

(52) U.S. Cl.
CPC ......... *G06Q 30/0631* (2013.01); *G06Q 10/10* (2013.01); *G06Q 30/0282* (2013.01); *G06Q 30/0627* (2013.01); *G06Q 30/0629* (2013.01); *G06Q 30/0641* (2013.01); *G06F 40/20* (2020.01); *G06N 3/02* (2013.01); *H04L 67/10* (2013.01)

(58) Field of Classification Search
CPC ............... G06Q 30/0631; G06Q 10/10; G06Q 30/0282; G06Q 30/0627; G06Q 30/0629; G06Q 30/0641; G06F 40/20
See application file for complete search history.

(56) References Cited

U.S. PATENT DOCUMENTS

| | | |
|---|---|---|
| 6,064,980 A * | 5/2000 | Jacobi ............... G06Q 30/06 705/1.1 |
| 6,963,848 B1 | 11/2005 | Brinkerhoff |
| 8,554,701 B1 | 10/2013 | Dillard et al. |
| 8,650,023 B2 | 2/2014 | Brun |
| 8,954,867 B2 | 2/2015 | Mushtaq et al. |
| 9,646,078 B2 | 5/2017 | Galitsky et al. |

(Continued)

FOREIGN PATENT DOCUMENTS

| CN | 102968408 A | 3/2013 |
|---|---|---|
| CN | 108038725 A | 5/2018 |

OTHER PUBLICATIONS

Mell et al., "The NIST Definition of Cloud Computing", National Institute of Standards and Technology, U.S. Department of Commerce, Special Publication 800-145, 7 pages.*

*Primary Examiner* — Kathleen Palavecino
(74) *Attorney, Agent, or Firm* — William H. Hartwell; Isaac J. Gooshaw

(57) ABSTRACT

A component-based review system for generating a digital recommendation is provided. A computing device monitors for one or more consumer-based reviews. A computing device identifies one or more commercial products or services associated with the one or more consumer-based reviews. A computing device generates a digital recommendation associated with the one or more consumer-based reviews.

20 Claims, 6 Drawing Sheets

(56) References Cited

U.S. PATENT DOCUMENTS

| | | |
|---|---|---|
| 10,410,224 B1 | 9/2019 | Levanon et al. |
| 2002/0077902 A1 | 6/2002 | Marcus |
| 2006/0020614 A1* | 1/2006 | Kolawa .................. G06Q 30/02 |
| 2014/0172744 A1* | 6/2014 | El-Hmayssi ....... G06Q 30/0282 |
| | | 705/347 |
| 2014/0280094 A1* | 9/2014 | Brandstetter ....... G06F 16/9535 |
| | | 707/723 |
| 2017/0004557 A1* | 1/2017 | Glasgow ............ G06Q 30/0631 |
| 2017/0091847 A1 | 3/2017 | Cama et al. |
| 2019/0122286 A1* | 4/2019 | Lang .................. G06Q 30/0217 |
| 2019/0266648 A1* | 8/2019 | Bleichenbacher .......................... |
| | | G06Q 30/0621 |
| 2020/0334737 A1* | 10/2020 | Miller ................ G06Q 30/0631 |

\* cited by examiner

COMPONENT BASED REVIEW SYSTEM

BACKGROUND OF THE INVENTION

The present invention relates generally to the field of consumer products, and more particularly to neural networks.

In general, consumers leverage customer feedback for consumer product or service purchases. Often, customer reviews can be unreliable due in part to a lack of authentication of the reviewer.

SUMMARY

Embodiments of the present invention provide a method, system, and program product for a component-based review system for generating a digital recommendation.

A first embodiment encompasses a method for a component-based review system for generating a digital recommendation. One or more processors monitor for one or more consumer-based reviews. One or more processors identify one or more commercial products or services associated with the one or more consumer-based reviews. One or more processors generate a digital recommendation associated with the one or more consumer-based reviews.

A second embodiment encompasses a computer program product for a component-based review system for generating a digital recommendation. The computer program product includes one or more computer-readable storage media and program instructions stored on the one or more computer-readable storage media. The program instructions include program instructions to monitor for one or more consumer-based reviews. The program instructions include program instructions to identify one or more commercial products or services associated with the one or more consumer-based reviews. The program instructions include program instructions generate a digital recommendation associated with the one or more consumer-based reviews.

A third embodiment encompasses a computer system for managing a component-based reviews system for generating a digital recommendation. The computer system includes one or more computer processors, one or more computer-readable storage medium, and program instructions stored on the computer readable storage medium for execution by at least one of the one or more processors. The computer program includes one or more computer-readable storage media and program instructions stored on the one or more computer-readable storage media. The program instructions include program instructions to monitor for one or more consumer-based reviews. The program instructions include program instructions to identify one or more commercial products or services associated with the one or more consumer-based reviews. The program instructions include program instructions generate a digital recommendation associated with the one or more consumer-based reviews.

DETAILED DESCRIPTION

Figure 1:
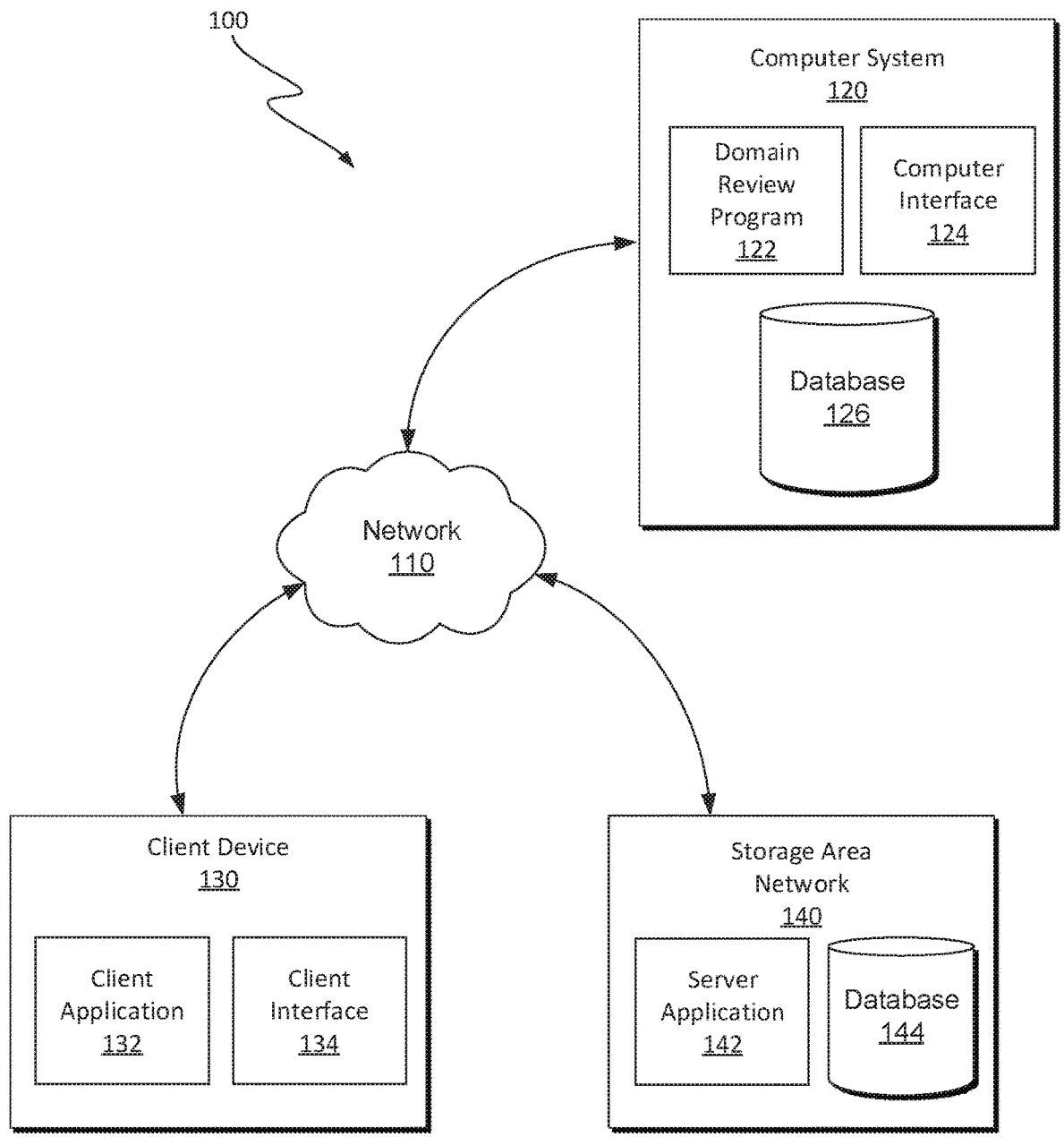
FIG. 1 is a functional block diagram illustrating a computing environment, in which a computing device generates component-based reviews through machine learning, accordance with an exemplary embodiment of the present invention.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While some solutions to product review systems are known, these solutions may be inadequate to proactively generate a product recommendation to a business entity when the quality assurance (QA) of a component and/or product or service is below a threshold value. Generally, in neural networks, a weighted model may be preferable to have a high accuracy of prediction, or to have the ability to correctly predict a result of an unknown. If the neural network reactively identifies customer-based reviews and uploads every review, the compiled lists will become cumbersome and ineffective to present any articulable information to consumers. Embodiments of the present invention provide a solution that proactively analyze and identify consumer-based reviews associated with one or more components related to a commercial product or service. Embodiments of the present invention further provide a solution that generates a product component recommendation to the business entity. In one embodiment, the system analyzes the consumer-based reviews and determines that one or more components does not meet a threshold value of quality assurance. Additionally, the system compiles the consumer-based reviews that rated the components below the threshold value of quality assurance and generates the product component recommendation that includes, one or a combination of: (i) one or more consumer-based reviews, (ii) a summary detailing the issues regarding one or more components of the commercial product or service, and (iii) the business entity that created the commercial product or service.

Embodiments of the present invention recognize that neutral networks quality assurance profiles generally generate I/O data. However, the I/O data may not be predictive but rather a summary of the I/O data collected from the quality assurance profile, and therefore the corresponding I/O data generated by the neural network may not forecast any quality assurance issues. Additionally, neural networks typically populate a computing device with results relating to the data collected from, and/or is generated based on, the quality assurance response and explanatory variables. As such, these and similar system may, in certain circumstances, be ineffective for forecasting quality assurance issues when compared to other solutions. The present invention provides a more effective system for forecasting quality assurance issues based on the quality assurance response and explanatory variables.

A problem remains with possible solutions insofar as a user is required to physically cipher between a plurality of consumer-based reviews including one or a combination of: one or more commercial products or services, one or more components associated with one or more commercial products or services, and various levels of expertise associated with one or more consumers who submitted reviews. It is advantageous to organize consumer-based reviews based on one or a combination of: (i) one or more commercial products or services, (ii) one or more components associated with the one or more commercial products or services, or (iii) threshold levels of expertise of the one or more consumers who submitted reviews of the commercial product or service. Additionally, the system leverages the compilation of one of more consumer-based reviews to generate a product recommendation to the business entity that produces the commercial product or service.

In one embodiment, domain review program 122 monitors for one or more consumer-based reviews. Domain review program 122 identifies one or more commercial products or services associated with the one or more consumer-based reviews. Domain review program 122 generates a digital recommendation associated with the one or more consumer-based reviews.

In one embodiment, domain review program 122 comprises a user interface that includes, one or a combination of: (i) a graphical user interface (GUI), (ii) a web user interface (WUI), (iii) command line interface (CLI), (iv) a menu driven interface, (v) a form based interface, or (vi) a natural language interface.

In one embodiment, domain review program 122 receives one or more consumer-based reviews. Domain review program 122 identifies one or a combination of: (i) one or more commercial products, (ii) one or more commercial services, (iii) one or more components associated with the commercial products or commercial services, (iv) the quality of the feedback, or (v) the expertise of a consumer who generated the consumer-based review, wherein the associated with the one or more consumer-based reviews. Domain review program 122 identifies an overall rating of the commercial product or commercial service associated with the consumer-based review. Domain review program 122 identifies one or more individual ratings for one or more components associated with the commercial product or commercial service. Domain review program 122 compiles (i) the overall ratings associated with the one or more consumer-based reviews and (ii) the one or more individual ratings for the one or more components associated with the commercial product or commercial service, identified in the one or more consumer-based reviews.

In one embodiment, domain review program 122 receives one or more review requests. Domain review program 122 analyzes the one or more review requests. Domain review program 122 identifies one or a combination of: (i) the commercial product or commercial service, and (ii) one or more components associated with the commercial product or commercial service, that are associated with the review request. Domain review program 122 determines the commercial product or commercial service a user wishes to purchase. Domain review program 122 identifies one or more similar commercial products or commercial services that include one or more components, that are associated with a threshold level rating based on the one or more consumer-based reviews.

In one embodiment, domain review program 122 determines one or more consumer-based reviews that include, one or a combination of: (i) one or more similar commercial products or commercial services, (ii) one or more components associated with the commercial products or commercial services, and (iii) one or more ratings associated with the commercial products or commercial services and the applicable one or more components. Domain review program 122 aggregates the one or more consumer-based reviews and the associated ratings. Domain review program 122 generates a digital recommendation.

In one embodiment, wherein the digital recommendation generated by domain review program 122 represents a UI and includes, one or a combination of: (i) the commercial product or commercial service identified in the review request, (ii) one or more commercial products or commercial services similar to the identified commercial product or commercial service, (iii) the overall rating associated with the similar commercial product or service and the identified commercial product or service, and (iv) the individual ratings of one or more components associated with the various commercial products or commercial services.

In one embodiment, domain review program 122 analyzes the one or more consumer-based reviews. Domain review program 122 identifies using natural language processors, one or a combination of: (i) one or more commercial products or commercial services, (ii) one or more components associated with one or more commercial products or commercial services, (iii) the quality of the feedback associated with the one or more consumer-based reviews, and (iv) one or more ratings associated with the overall commercial product and/or service and individual ratings associated with one or more components of the commercial product and/or service. Domain review program 122 analyzes (i) the quality of the feedback associated with the one or more consumer-based reviews, and (ii) one or more ratings associated with the overall commercial product and/or service and individual ratings associated with one or more components of the commercial product and/or service. Domain review program 122 calculates an average rating associated with a commercial product or commercial service based on one or a combination of: (i) overall rating of the commercial product and/or service, (ii) one or more ratings of one or more components associated with the commercial product and/or service, and (iii) the quality of the feedback associated with the one or more consumer-based reviews. Domain review program 122 generates a commercial evaluation. Domain review program 122 communicates the commercial evaluation to a business entity.

The present invention will now be described in detail with reference to the Figures.

FIG. 1 is a functional block diagram illustrating computing environment, generally designated 100, in accordance with one embodiment of the present invention. Computing environment 100 includes computer system 120, client device 130, and storage area network (SAN) 140 connected over network 110. Computer system 120 includes domain review program 122, computer interface 124, and database 126. Client device 130 includes client application 132 and client interface 134. SAN 140 includes server application 142 and database 144.

In various embodiments of the present invention, computer system 120 is a computing device that can be a standalone device, a server, a laptop computer, a tablet computer, a netbook computer, a personal computer (PC), a personal digital assistant (PDA), a desktop computer, or any programmable electronic device capable of receiving, sending and processing data. In general, computer system 120 represents any programmable electronic device or combination of programmable electronic devices capable of executing machine readable program instructions and communications with various other computer systems (not shown). In another embodiment, computer system 120 represents a computing system utilizing clustered computers and components to act as a single pool of seamless resources. In general, computer system 120 can be any computing device or a combination of devices with access to various other computing systems (not shown) and is capable of executing domain review program 122, computer interface 124, and database 126. Computer system 120 may include internal and external hardware components, as described in further detail with respect to FIG. 1.

In this exemplary embodiment, domain review program 122, computer interface 124, and database 126 are stored on computer system 120. However, in other embodiments, domain review program 122, computer interface 124, and database 126 are stored externally and accessed through a communication network, such as network 110. Network 110 can be, for example, a local area network (LAN), a wide area network (WAN) such as the Internet, or a combination of the two, and may include wired, wireless, fiber optic or any other connection known in the art. In general, network 110 can be any combination of connections and protocols that will support communications between computer system 120, client device 130, SAN 140, and various other computer systems (not shown), in accordance with a desired embodiment of the present invention.

In various embodiments of the present invention, the various other computer systems (not shown) can be a standalone device, a server, a laptop computer, a tablet computer, a netbook computer, a personal computer (PC), a desktop computer, or any programmable electronic device capable of receiving, sending, and processing data. In another embodiment, the various other computer systems represent a computing system utilizing clustered computers and components to act as a single pool of seamless resources. In general, the various other computer systems can be any computing device or combination of devices with access to computer system 120, client device 130, SAN 140 and network 110 and is capable of executing domain review program 122, computer interface 124, and database 126. The various other computer systems may include internal and external hardware components as depicted and described in further detail with respect to FIG. 1.

In the embodiment depicted in FIG. 1, domain review program 122, at least in part, has access to client application 132 and can communicate data stored on computer system 120 to client device 130, SAN 140, and various other computer systems (not shown). More specifically, domain review program 122 defines a user of computer system 120 that has access to data stored on client device 130 and/or database 144.

Domain review program 122 is depicted in FIG. 1 for illustrative simplicity. In various embodiments of the present invention, domain review program 122 represents logical operations executing on computer system 120, where computer interface 124 manages the ability to view these logical operations that are managed and executed in accordance with domain review program 122. In some embodiments, domain review program 122 represents a cognitive AI system that processes and analyzes input and output (I/O). Additionally, domain review program 122, when executing cognitive AI processing, operates to learn from the I/O that was analyzed and generate a product component recommendation based, at least, on the analyzation operation. In some embodiments, domain review program 122 determines whether a specific action is likely to take place and generates a digital recommendation and communicates the recommendation to SAN 140.

Computer system 120 includes computer interface 124. Computer interface 124 provides an interface between computer system 120, client device 130, and SAN 140. In some embodiments, computer interface 124 can be a graphical user interface (GUI) or a web user interface (WUI) and can display text, documents, web browser, windows, user options, application interfaces, and instructions for operation, and includes the information (such as graphic, text, and sound) that a program presents to a user and the control sequences the user employs to control the program. In some embodiments, computer system 120 accesses data communicated from client deice 130 and/or SAN 140 via a client-based application that runs on computer system 120. For example, computer system 120 includes mobile application software that provides an interface between computer system 120, client device 130, and SAN 140.

In various embodiments of the present invention, client device 130 is a computing device that can be a standalone device, a server, a laptop computer, a tablet computer, a netbook computer, a personal computer (PC), a personal digital assistant (PDA), a desktop computer, or any programmable electronic device capable of receiving, sending and processing data. In general, client device 130 represents any programmable electronic device or combination of programmable electronic devices capable of executing machine readable program instructions and communications with various other computer systems (not shown). In another embodiment, client device 130 represents a computing system utilizing clustered computers and components to act as a single pool of seamless resources. In general, client device 130 can be any computing device or a combination of devices with access to various other computing systems (not shown) and is capable of executing client application 132 and client interface 134. Client device 130 may include internal and external hardware components, as described in further detail with respect to FIG. 1. Storage area network (SAN) 140 is a storage system that includes server application 142 and database 144. SAN 140 may include one or more, but is not limited to, computing devices, servers, server-clusters, web-servers, databases and storage devices. SAN 140 operates to communicate with computer system 120, client device 130, and various other computing devices (not shown) over a network, such as network 110. For example, SAN 140 communicates with domain review program 122 to transfer data between, but is not limited to, computer system 120, client device 130, and various other computing devices (not shown) that are connected to network 110. SAN 140 can be any computing device or a combination of devices that communicatively connected to a local IoT network, i.e., a network comprised of various computing devices including, but are not limited to computer system 120 and client device 130 to provide the functionality described herein. SAN 140 can include internal and external hardware components as described with respect to FIG. 6. The present invention recognizes that FIG. 1 may include any number of computing devices, servers, databases, and/or storage devices, and the present invention is not limited to only what is depicted in FIG. 1. As such, in some embodiments, some or all of the features and functions of SAN 140 are included as part of computer system 120, client device 130 and/or another computing device. Similarly, in some embodiments, some of the features and functions of computer system 120 are includes as part of SAN 140 and/or another computing device.

Additionally, in some embodiments, SAN 140 represents, or is part of, a cloud computing platform. Cloud computing is a model or service delivery for enabling convenient, on demand network access to shared pool of configurable computing resources (e.g., networks, network bandwidth, servers, processing, memory, storage, applications, virtual machines, and service(s) that can be rapidly provisioned and released with minimal management effort or interaction with a provider of a service. A cloud model may include characteristics such as on-demand self-service, broad network access, resource pooling, rapid elasticity, and measured service, can be represented by service models including a platform as a service (PaaS) model, an infrastructure as a service (IaaS) model, and a software as a service (SaaS) model, and can be implemented as various deployment models including as a private cloud, a community cloud, a public cloud, and a hybrid cloud.

In various embodiments, SAN 140 is depicted in FIG. 1 for illustrative simplicity. However, it is to be understood that, in various embodiments, SAN 140 can include any number of databases that are managed in accordance with the functionality of server application 142. In general, database 144 represents data and server application 142 represents code that provides an ability to take specific action with respect to another physical or virtual resource and manages the ability to use and modify the data. In an alternative embodiment, domain review program 122 can also represent any combination of the aforementioned features, in which server application 142 has access to database 144. To illustrate various aspect of the present invention, examples of server application 142 are presented in which domain review program 122 represents one or more of, but is not limited to, a local IoT network and contract event monitoring system.

In some embodiments, server application 142 and database 144 are stored on SAN 140. However, in other embodiments, server application 142 and database 144 may be stored externally and accessed through a communication network, such as network 110, as discussed above.

In one embodiment of the present invention, domain review program 122 defines a system for generating related datasets for one or more unstructured electronic documents and/or unstructured data for computer system 120 that has access to consumer-based reviews on SAN 140 and has access to consumer-based reviews on other computer systems (e.g., various other computing devices).

In various embodiments, SAN 140 represents an internet-based service for storing and transcribing electronic documents and/or datasets. IN various embodiments, SAN 140 encompasses software, servers, databases, webservers, and web pages supported by software to operate and maintain an internet-based service for information sharing. Users of computer system 120 and/or client device 130 have access to databases maintained and supported by SAN 140 via any communicative connection known in the art. One or more users have the availability to edit, change, or alter datasets stored on SAN 140 and are accessible by any communication connection known in the art.

In various embodiments depicted in FIG. 1, domain review program 122 obtains data related to consumer-based reviews from client device 130 and/or SAN 140. In other embodiments, domain review program 122 represents an internet-based service for storing and transcribing electronic document and/or datasets. Consumer-based review data is stored on database 126. However, in some embodiments, consumer-based review data can be stored on client device 130, database 144 executing on SAN 140, and/or stored on various other computing devices (not shown). In various embodiments, consumer-based review data represent various reviews associated with various consumer products or services. Additionally, the consumer-based review data includes data of one or more components associated with various consumer products or services.

In various embodiments of the present invention, a user of client device 130 (hereinafter "consumer") generates a consumer request and communicates the request to computer system 120. In various embodiments, the consumer request is associated with a specific individual for whom the consumer-based review data is associated with. In various embodiments, the consumer request is associated with, one or a combination of, (i) one or more individuals, (ii) one or more consumer-based reviews, (iii) one or more components associated with a commercial product or service, and (iv) various threshold levels of expertise of the one or more individuals. Client application 132 generates the consumer request based on the consumer's direction and communicates the consumer request to computer system 120 to generate a compilation of consumer-based reviews associated with one or more components.

In various embodiments of the present invention, a user of client device 130 utilizing client application 132 communicates one or more consumer-based reviews to computer system 120 and/or SAN 140. Domain review program 122 executing on computer system 120 receives one or more consumer-based reviews from, at least, one user of client device 130. In some embodiments, server application 142 executing on SAN 140 receives one or more consumer-based reviews from one or more users of client device 130.

In various embodiments of the present invention, domain review program 122 analyzes the one or more consumer-based reviews received from client device 130. Domain review program 122 identifies, one or a combination of: (i) the commercial product and/or service, (ii) one or more components associated with the commercial product and/or service (iii) the quality of feedback (e.g., positive feedback, negative feedback, or neutral feedback), (iv) the quantitative value of the feedback (e.g., a rating system, ranking system), (v) the expertise of a consumer who generated the review.

In various embodiments of the present invention, one or more consumer-based reviews include a description and/or commentary associated with a commercial product and/or service. Additionally, this description and/or commentary further discusses one or more specific components related to the commercial product and/or service. In various embodiments, domain review program 122 identifies the description and/or commentary related to the commercial product and/or service and further identifies each component discussed within the one or more consumer-based reviews.

The present invention recognizes that domain review program 122 analyzes the one or more consumer-based reviews and identifies the quantitative value of the feedback associated with the one or more consumer-based reviews. In various embodiments of the present invention, domain review program 122 identifies a value associated with the commercial product and/or service (e.g., a rating out of five or 10 denoted as X/5 or X/10, wherein the "X" represents the value provided by the consumer). Additionally, domain review program 122 identifies individual ratings for one or more components associated with commercial product and/or service. Domain review program 122 stores this data on database 126. In some embodiments, domain review program 122 communicates this data to SAN 140 and the data is stored on database 144.

In various embodiments of the present invention, domain review program 122 analyzes one or more consumer-based reviews and identifies one or more consumers who have created one or more consumer-based reviews. Domain review program 122 accesses database 126, and in some embodiments accesses database 144, and retrieves one or more reviews associated with each respective consumer from one or more consumers. In various embodiments, domain review program 122 analyzes the content associated with each respective consumer-based review for each individual consumer. In various embodiments, domain review program 122 identifies a threshold level of expertise (e.g., novice, moderate, expert) of each respective consumer that submitted a review.

In various embodiments, domain review program 122 actively monitors for one or more consumer-based reviews associated with one or more commercial products and/or services. Domain review program 122 aggregates the one or more consumer-based reviews for one or more commercial products and/or services and compiles the consumer-based reviews for each respective commercial product and/or service. Additionally, domain review program 122 further aggregates the ratings associated with the one or more consumer-based reviews and weighs the average rating associated with one or a combination of: (i) overall average rating of the commercial product and/or service, (ii) average rating for one or more components associated with the commercial product and/or service, and (iii) similar components associated with one or more commercial products and/or services unrelated to a particular commercial product and/or service.

In various embodiments, the present invention is a graphical user interface (GUI) or a web user interface (WUI), wherein a consumer utilizing client interface 134 communicates with domain review program 122 over network 110. In various embodiments client interface 134 includes one or a combination of, (i) a software application, (ii) one or more graphical control elements, (iii) one or more text boxes, and (iv) one or more search fields.

In various embodiments of the present invention, a consumer utilizing client device 130 utilizes client interface 134 to generate a review request associated with one or more commercial products and/or services. Client application 132 executing on client device 130 receives the review request from client interface 134 and communicates the review request to domain review program 122. In some embodiments, domain review program 122 communicates a set of program instructions to client application 132 instructing client application 132 to communicate each review request that client application 132 receives from client interface 134.

The present invention recognizes that domain review program 122 receives the review request and analyzes the review request to identify one or a combination of: (i) the commercial product and/or service, (ii) one or more components associated with the commercial product and/or service. In some embodiments, domain review program 122 identifies the commercial product and/or service and, additionally, (i) identifies one or more components associated with the commercial product and/or service and (ii) similar commercial products and/or services that include one or a combination of the one or more components identified in the review request. In various embodiments, domain review program 122 additionally suggests similar products and/or services that include a threshold level rating with one or more commercial products and/or services and the accompanying one or more components associated with one or more consumer reviews. The present invention recognizes that domain review program 122 suggests similar commercial products and/or services similar to the identified commercial product and/or service in the review request, wherein domain review program 122 determines that the user of client device 130 might be interested in.

In various embodiments, domain review program 122 determines (i) the commercial product and/or service identified within the review request and (ii) the one or more components associated with the review request. Domain review program 122 accesses database 126 and in some embodiments accesses database 144 to retrieve one or more consumer-based reviews associated with the content contained within the review request received. Domain review program 122 analyzes the one or more consumer-based reviews associated with (i) the identified commercial product and/or service and (ii) one or more similar commercial products and/or services. In various embodiments, domain review program 122 aggregates one or more consumer-based reviews and generates a digital recommendation based on the review request submitted by the consumer of client device 130.

In various embodiments of the present invention, the digital recommendation represents a GUI and includes, one or a combination of: (i) a software application, (ii) one or more graphical control elements, (iii) one or more text boxes, and (iv) one or more search fields. Additionally, domain review program 122 communicates the digital recommendation to client application 132 with program instructions instructing client application 132 to populate the digital recommendation on client interface 134. In various embodiments, the digital recommendation is populated for a consumer of client device 130 and coaches the consumer of client device 130 to interact with the digital recommendation utilizing (i) the one or more graphical control elements, (ii) the one or more text boxes, and (iii) the one or more search fields.

In various embodiments of the present invention, the digital recommendation communicates to the consumer of client device 130 one or more consumer-based reviews associated with (i) the commercial product and/or service identified in the review request and (ii) one or more commercial products and/or services similar to the commercial product and/or service identified in the review request. In various embodiments, the digital recommendation further includes consumer-based reviews and ratings associated with one or more components of (i) the commercial product and/or service identified in the review request and (ii) one or more commercial products and/or services similar to the commercial product and/or service identified in the review request.

In various embodiments, the digital recommendation includes, one or a combination of, (i) overall average rating of the identified commercial product and/or service, (ii) average rating of one or more components associated with the identified commercial product and/or service, and (iii) similar commercial products and/or services and the accompanying overall ratings and ratings of the one or more components similar to the identified commercial product and/or service.

In various embodiments, a consumer of client device 130 utilizes (i) one or more graphical control elements, (ii) one or more text boxes, and (iii) one or more search fields to interact with the digital recommendation. In some embodiments, the consumer refines the list of consumer-based reviews. In various embodiments, the consumer searches for a particular component associated with (i) the identified commercial product and/or service and (ii) the one or more similar commercial products and/or services as a comparison model between the one or more commercial products and/or services. Additionally, a consumer accesses the business entities website associated with a commercial product and/or service.

Figure 2:
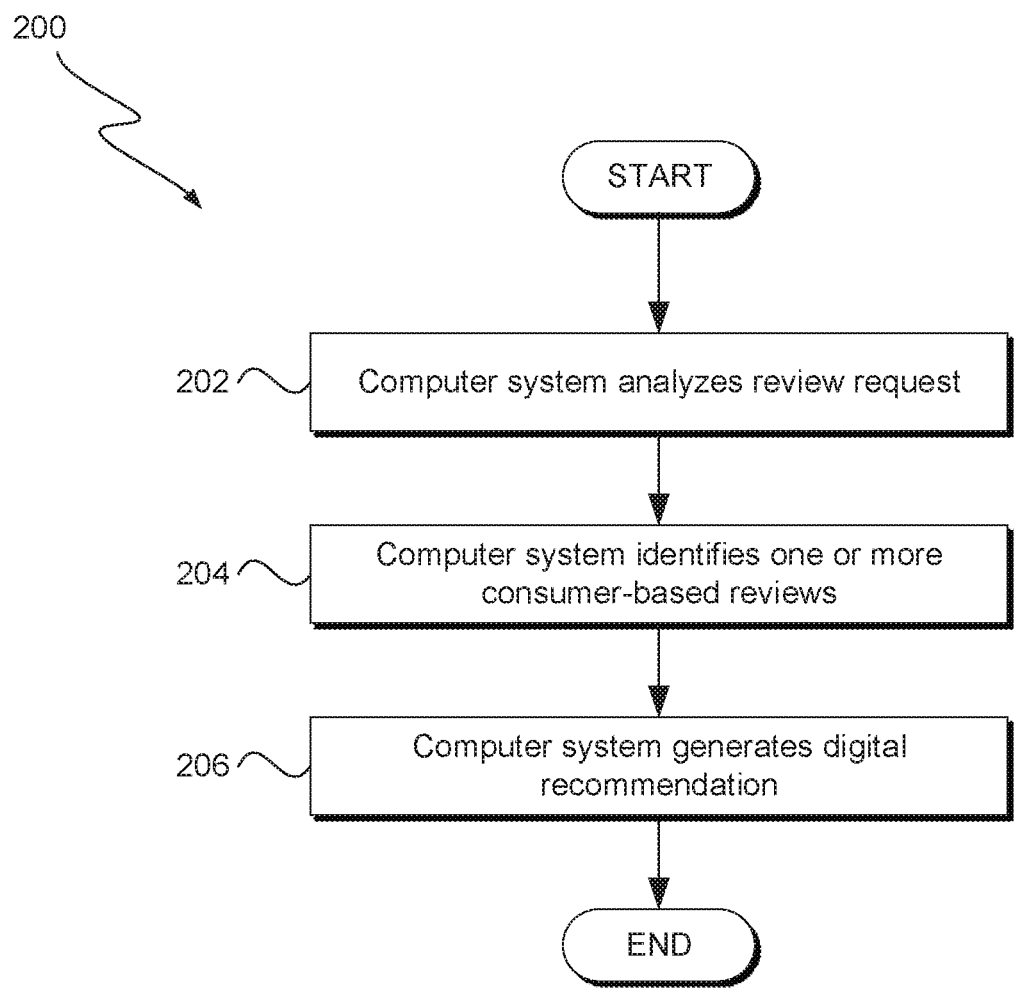
FIG. 2 illustrates operational processes of executing a system for a digital recommendation, on a computing device within the environment of FIG. 1, in accordance with an exemplary embodiment of the present invention.

FIG. 2 is a flowchart, 200, depicting operations of domain review program 122 in computing environment 100, in accordance with an illustrative embodiment of the present invention. More specifically, FIG. 2, depicts combined overall operations 200 of domain review program 122 executing on computer system 120. In some embodiments, operations 200 represents logical operations of client application 132 executing on client device 130. It should be appreciated that FIG. 2 provides an illustration of one implementation and does not imply any limitations with regard to the environments in which different embodiments may be implemented. Many modifications to the depicted environment may be made. In one embodiment of flowchart 200, the series of operations can be performed in any order. In another embodiment, the series of operations, of flowchart 200, can be performed simultaneously. Additionally, the series of operations, in flowchart 200, can be terminated in any operation. In addition to the features previously mentioned, any operations, of flowchart 200, can be resumed at any time.

In operation 202, domain review program 122 receives one or more consumer-based reviews from one or more consumer utilizing client device 130. In various embodiments, domain review program 122 analyzes the one or more consumer-based reviews and identifies, one or a combination of: (i) the commercial product and/or service, (ii) one or more components associated with the commercial product and/or service (iii) the quality of feedback (e.g., positive feedback, negative feedback, or neutral feedback), (iv) the quantitative value of the feedback (e.g., a rating system, ranking system), (v) the expertise of a consumer who generated the review (operation 204). Domain review program 122 stores the identified data on database 126, and in some embodiments stores the database on database 144.

In operation 206, domain review program 122 receives a review request from a consumer of client device 130 associated with at least one commercial product and/or service. In some embodiments, domain review program 122 analyzes a review request from a consumer of client device 130 associated with one or more commercial products and/or services. In various embodiments, domain review program 122 identifies one or more consumer-based reviews related to the review request and generates a digital recommendation and communicates the review request to client application 132 with program instructions instructing client application 132 to populate client interface 134 with the digital recommendation.

Figure 3:
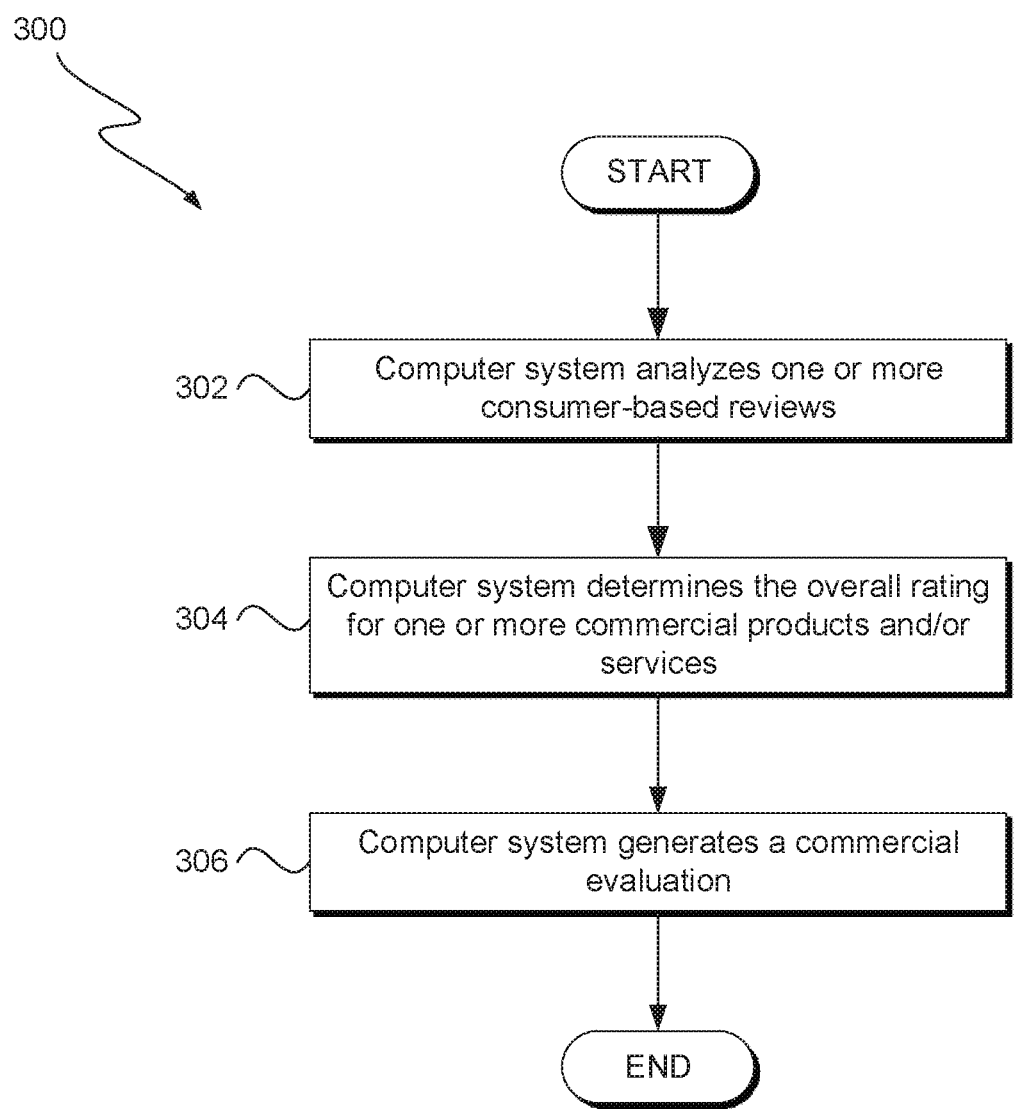
FIG. 3 illustrates operational processors of executing a system for a digital recommendation, on a computing device within the environment of FIG. 1, in accordance with an exemplary embodiment of the present invention.

FIG. 3 depicts a flowchart depicting operations for an alert system for computing environment 100, in accordance with an illustrative embodiment of the present invention. More specifically, FIG. 3, depicts combined overall operations, 300, of domain review program 122 executing on computer system 120. It should be appreciated that FIG. 3 provides an illustration of one implementation and does not imply any limitations with regard to the environments in which different embodiments may be implemented. Many modifications to the depicted environment may be made. In one embodiment, the series of operations, of flowchart 300, can be performed simultaneously. Additionally, the series of operations, in flowchart 300, can be terminated at any operation. In addition to the features previously mentioned, any operation, of flowchart 300, can be resumed at any time.

In operation 302, domain review program 122 analyzes one or more consumer-based reviews. In various embodiments, domain review program 122 analyzes the one or more consumer-based reviews to identify, one or a combination of, (i) one or more commercial products and/or services, (ii) one or more components associated with one or more commercial products and/or services, (iii) the quality of the feedback associated with the one or more consumer-based reviews (e.g., positive, negative, etc.), and (iv) one or more ratings associated with the overall commercial product and/or service and individual ratings associated with one or more components of the commercial product and/or service.

In operation 304, domain review program 122 determines the overall rating of the one or more consumer-based reviews associated with each individual commercial product and/or service. In various embodiments, domain review program 122 calculates the average rating of the overall rating of the commercial product and/or service. In some embodiments, domain review program 122 calculates the average rating associated with a commercial product and/or service based one or a combination of the following: (i) overall rating of the commercial product and/or service, (ii) one or more ratings of one or more components associated with the commercial product and/or service, and (iii) the quality of the feedback associated with the one or more consumer-based reviews.

In operation 306, domain review program 122 generates a digital recommendation associated with commercial product and/or service. In various embodiments, domain review program 122 communicates the digital recommendation to the business entity that owns (e.g., manufactures, distributes, services, etc.) the commercial product and/or service.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
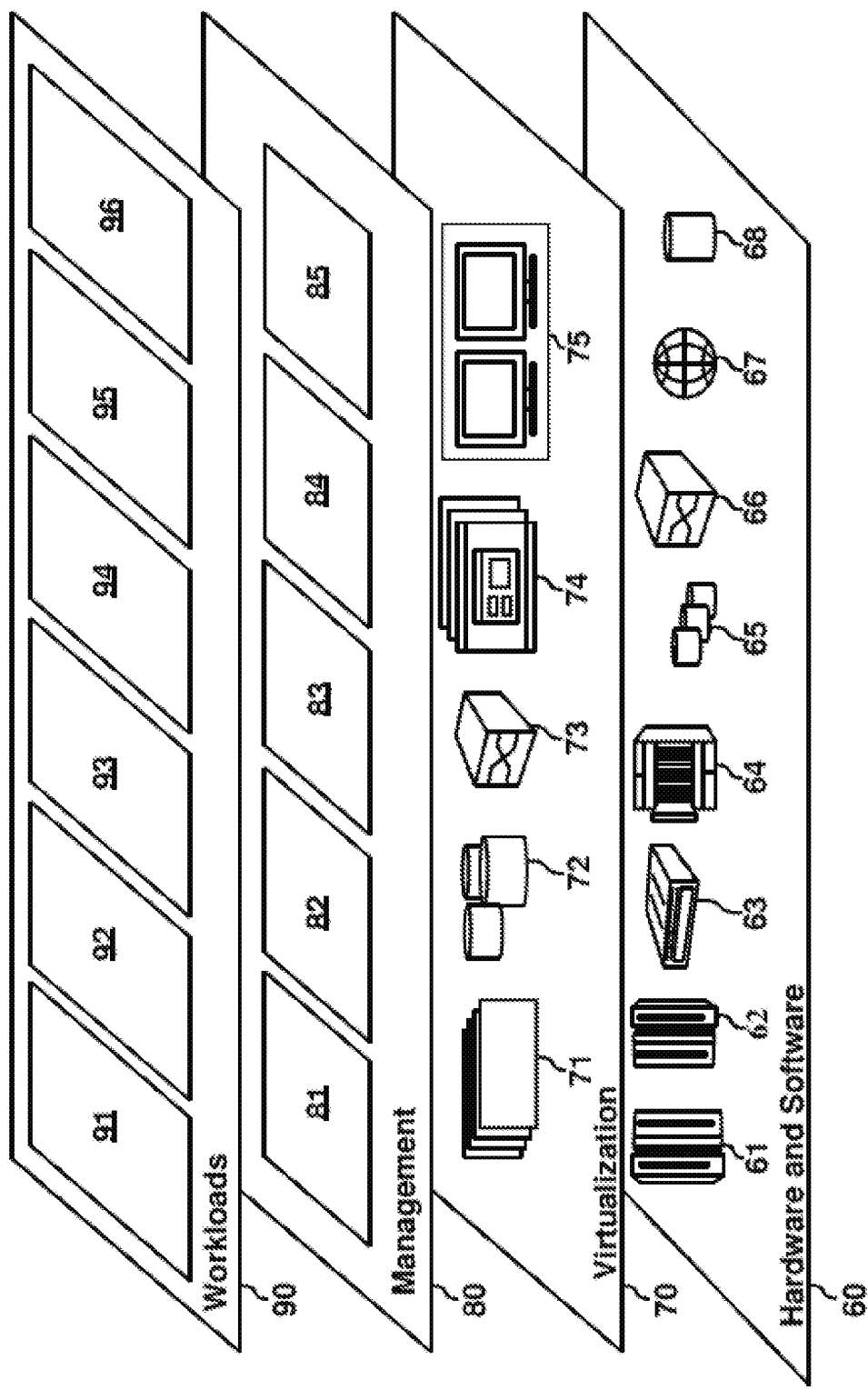
FIG. 4 depicts a cloud computing environment according to at least one embodiment of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
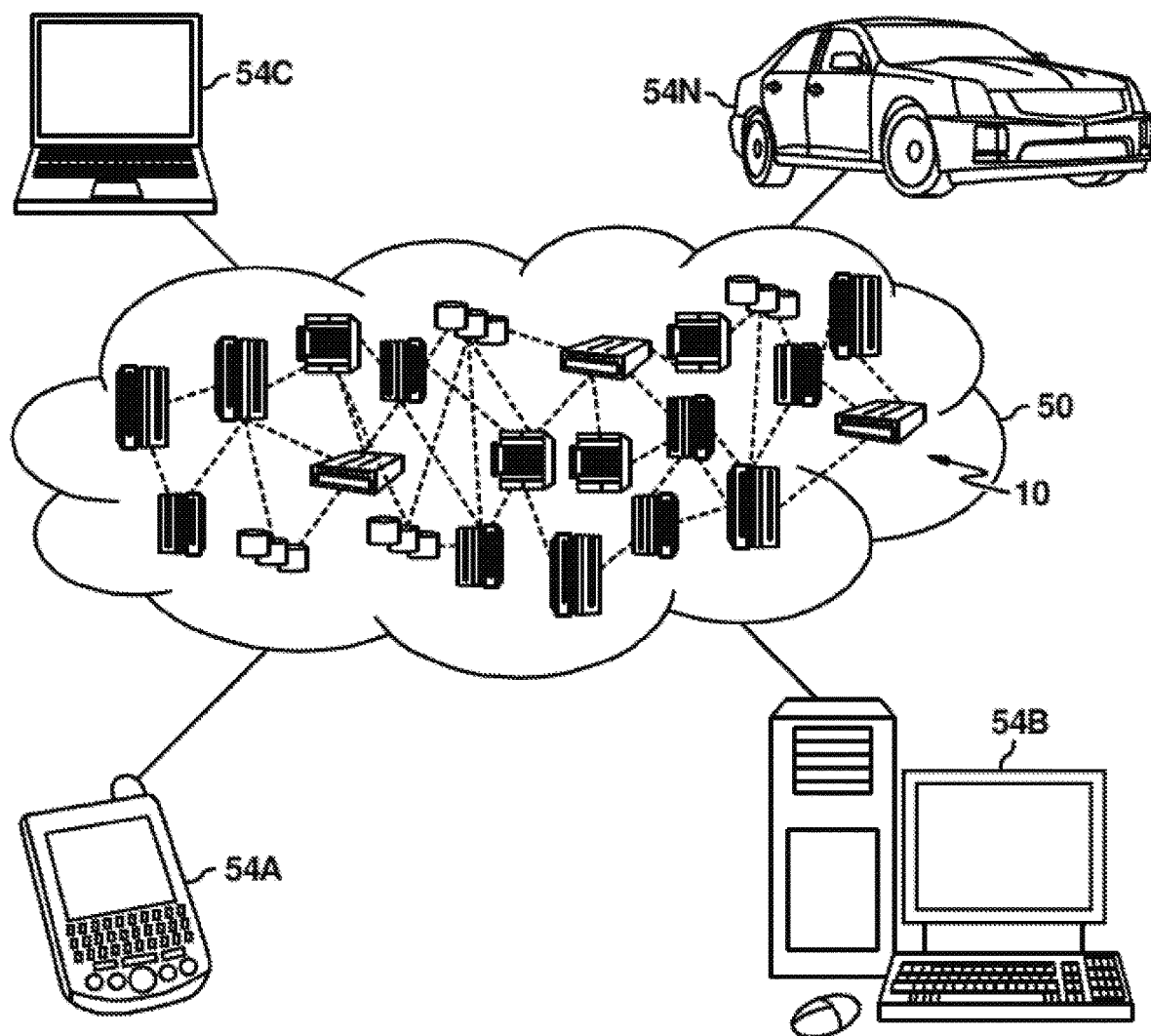
FIG. 5 depicts abstraction model layers according to at least on embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing soothing output 96.

Figure 6:
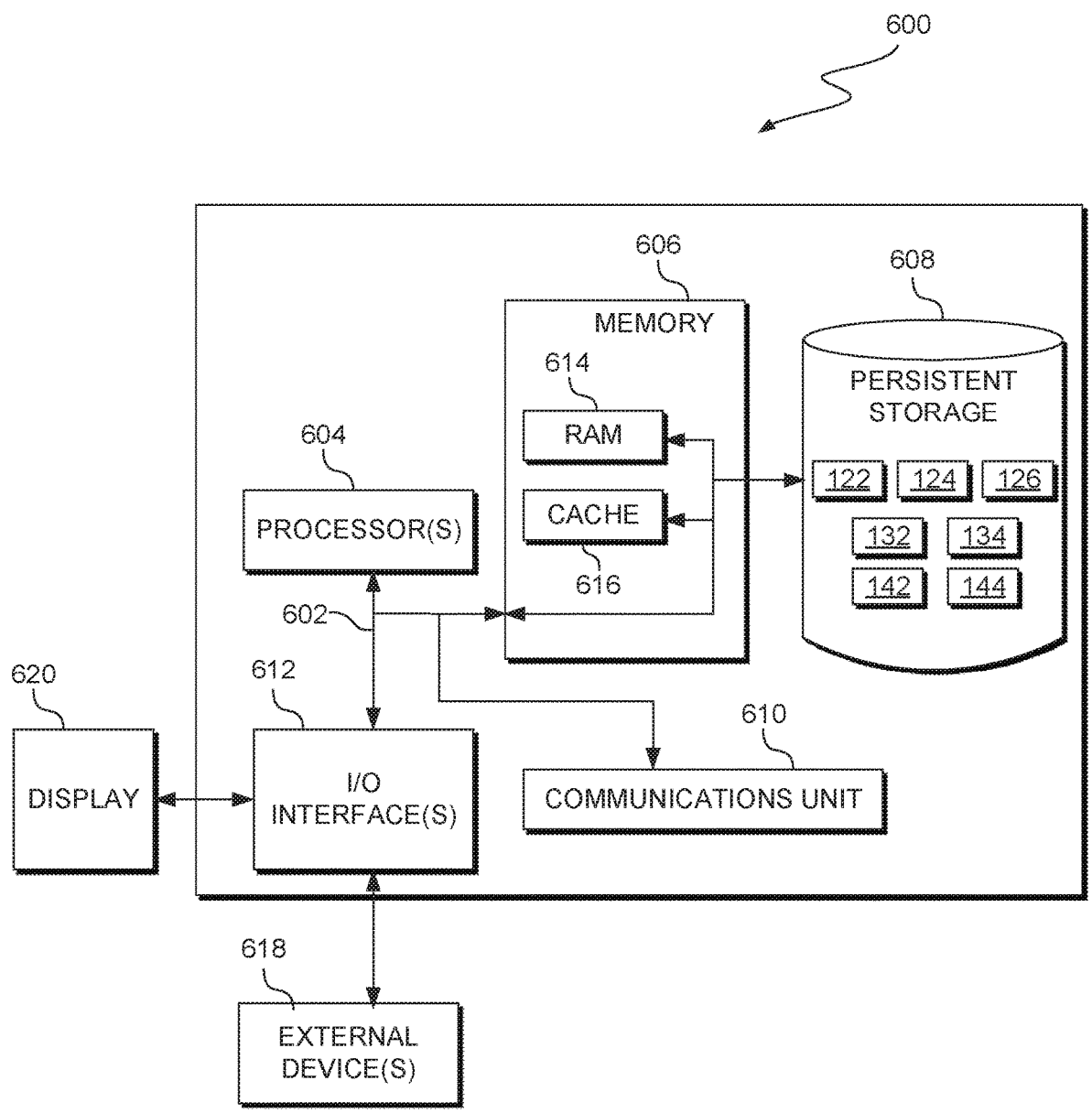
FIG. 6 depicts a block diagram of components of one or more computing devices within the computing environment depicted in FIG. 1, in accordance with an exemplary embodiment of the present invention.

FIG. 6 depicts block diagram, 600, of components of computer system 120, client device 130 and SAN 140, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computer system 120, client device 130, and SAN 140 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Domain review program 122, computer interface 124, database 126, client application 132, client interface 134, server application 142, and database 144 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 110. In these examples, communications unit 610 includes one or more network interface cards. Communications unit 610 may provide communications through the use of either or both physical and wireless communications links. Domain review program 122, computer interface 124, database 126, client application 132, client interface 134, server application 142, and database 144 may be downloaded to persistent storage 608 through communications unit 610.

I/O interface(s) 612 allows for input and output of data with other devices that may be connected to computer system 120, client device 130, and SAN 140. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., Domain review program 122, computer interface 124, database 126, client application 132, client interface 134, server application 142, and database 144, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A computer-implemented method, the method comprising:

monitoring, by one or more processors, for one or more consumer-based reviews relating to one or more commercial products or services;

identifying, by one or more processors, one or more individual components of the commercial products or services, the individual components having respective individual ratings in the one or more consumer-based reviews identifying, by one or more processors, levels of expertise relating to respective consumers that submitted the one or more consumer-based reviews;

generating, by one or more processors, a quality assurance value for a commercial product or service based, at least in part, on providing, as inputs to a neural network: (i) the identified one or more individual components, and (ii) the identified levels of expertise;

weighting, by one or more processors, the quality assurance value for the commercial product or service based, at least in part, on: (i) an overall average rating of the commercial product or service, (ii) an average rating for the identified one or more individual components of the commercial product or service, and (iii) similar components associated with one or more commercial products or services unrelated to the particular commercial product or service; and generating, by one or more processors, a digital recommendation associated with the one or more consumer-based reviews based, at least in part, on the weighted quality assurance value.

2. The computer-implemented method of claim 1, the method further comprising:
communicating, by one or more processors, the digital recommendation to a user using a user interface, wherein the user interface is: (i) a web user interface (WUI) and (ii) a form based interface.

3. The computer-implemented method of claim 1, wherein the quality assurance value is further based, at least in part, on providing additional inputs to the neural network, wherein the additional inputs include
(i) one or more overall ratings associated with the one or more consumer-based reviews, (ii) the one or more respective individual ratings for the identified one or more individual components, and (iii) a quality of feedback value relating to the one or more consumer-based reviews.

4. The computer-implemented method of claim 1, the method further comprising:
receiving, by one or more computer processors, a review request relating to a commercial product or service the user wishes to purchase;
identifying, by one or more computer processors: (i) the commercial product or service associated with the review request, and (ii) the one or more individual components of the commercial product or service associated with the review request; and
determining, by one or more computer processors, one or more similar commercial products or services to the commercial product or service the user wishes to purchase.

5. The computer-implemented method of claim 4, wherein the determining of the one or more similar commercial products or services to the commercial product or service the user wishes to purchase is based, at least in part, on: (i) the one or more individual ratings of the individual components of the commercial product or service the user wishes to purchase, (ii) an overall rating of the commercial product or commercial service the user wishes to purchase, (iii) one or more individual ratings of individual components of the similar commercial products or services, and (iv) an overall rating of the similar commercial products or services.

6. The computer-implemented method of claim 1, wherein the digital recommendation represents a UI and includes: (i) an overall rating associated with a commercial product or service identified in a review request, (ii) individual ratings of the one or more individual components the commercial product or service identified in the review request, (iii) overall ratings associated with similar commercial products or services to the commercial product or service identified in the review request, and (iv) individual ratings of one or more individual components associated with the similar commercial products or services.

7. The method of claim 1, the method further comprising:
calculating, by the one or more computer processors, an average rating associated with the commercial product or service based, at least in part, on: (i) an overall rating of the commercial product or service, (ii) respective individual ratings of the one or more individual components of the commercial product or service, and (iii) quality of received feedback associated with the one or more consumer-based reviews;

generating, by the one or more computer processors, a commercial evaluation based, at least in part, on the calculated average rating; and
communicating, by the one or more computer processors, the commercial evaluation to a business entity.

8. A computer program, the computer program product comprising:
one or more non-transitory computer-readable storage media and program instructions stored on the one or more computer-readable storage media, the stored program instructions comprising:
program instructions to monitor for one or more consumer-based reviews relating to one or more commercial products or services;
program instructions to identify one or more individual components of the commercial products or services, the individual components having respective individual ratings in the one or more consumer-based reviews;
program instructions to identify levels of expertise relating to respective consumers that submitted the one or more consumer-based reviews;
program instructions to generate a quality assurance value for a commercial product or service based, at least in part, on providing, as inputs to a neural network: (i) the identified one or more individual components, and (ii) the identified levels of expertise;
program instructions to weight, by one or more processors, the quality assurance value for the commercial product or service based, at least in part, on: (i) an overall average rating of the commercial product or service, (ii) an average rating for the identified one or more individual components of the commercial product or service, and (iii) similar components associated with one or more commercial products or services unrelated to the particular commercial product or service; and
program instructions to generate a digital recommendation associated with the one or more consumer-based reviews based, at least in part, on the generated quality assurance value.

9. The computer program product of claim 8, the stored program instructions further comprising:
program instructions to communicate the digital recommendation to a user using a user interface, wherein the user interface is: (i) a web user interface (WUI) and (ii) a form based interface.

10. The computer program product of claim 8, wherein the quality assurance value is further based, at least in part, on providing additional inputs to the neural network, wherein the additional inputs include (i) one or more overall ratings associated with the one or more consumer-based reviews, (ii) the one or more respective individual ratings for the identified one or more individual components, and (iii) a quality of feedback value relating to the one or more consumer-based reviews.

11. The computer program product of claim 8, the stored program instructions further comprising:
program instructions to receive a review request relating to a commercial product or service the user wishes to purchase;
program instructions to identify: (i) the commercial product or commercial service associated with the review request, and (ii) the one or more individual components of the commercial product or commercial service associated with the review request; and
program instructions to determine one or more similar commercial products or services to the commercial product or service the user wishes to purchase.

12. The computer program product of claim 11, wherein the determining of the one or more similar commercial products or services to the commercial product or service the user wishes to purchase is based, at least in part, on: (i) the one or more individual ratings of the individual components of the commercial product or service the user wishes to purchase, (ii) an overall rating of the commercial product or commercial service the user wishes to purchase, (iii) one or more individual ratings of individual components of the similar commercial products or services, and (iv) an overall rating of the similar commercial products or services.

13. The computer program product of claim 8, wherein the digital recommendation represents a UI and includes: (i) an overall rating associated with a commercial product or service identified in a review request, (ii) individual ratings of the one or more individual components the commercial product or service identified in the review request, (iii) overall ratings associated with similar commercial products or services to the commercial product or service identified in the review request, and (iv) individual ratings of one or more individual components associated with the similar commercial products or services.

14. The computer program product of claim 8, the stored program instruction further comprising:
program instructions to calculate an average rating associated with the commercial product or service based, at least in part, on: (i) an overall rating of the commercial product and/or service, (ii) respective individual ratings of one or more individual components of the commercial product and/or service, and (iii) quality of received feedback associated with the one or more consumer-based reviews;
program instructions to generate a commercial evaluation based, at least in part, on the calculated average rating; and
program instructions to communicate the commercial evaluation to a business entity.

15. A computer system, the computer system comprising:
one or more computer processors;
one or more computer readable storage medium; and
program instructions stored on the computer readable storage medium for execution by at least one of the one or more processors, the stored program instructions comprising:
program instructions to monitor for one or more consumer-based reviews relating to one or more commercial products or services;
program instructions to identify one or more individual components of the commercial products or services, the individual components having respective individual ratings in the one or more consumer-based reviews;
program instructions to identify levels of expertise relating to respective consumers that submitted the one or more consumer-based reviews;
program instructions to generate a quality assurance value for a commercial product or service based, at least in part, on providing, as inputs to a neural network: (i) the identified one or more individual components, and (ii) the identified levels of expertise;
program instructions to weight, by one or more processors, the quality assurance value for the commercial product or service based, at least in part, on: (i) an overall average rating of the commercial product or service, (ii) an average rating for the identified one or more individual components of the commercial product or service, and (iii) similar components associated with one or more commercial products or services unrelated to the particular commercial product or service; and
program instructions to generate a digital recommendation associated with the one or more consumer-based reviews based, at least in part, on the generated quality assurance value.

16. The computer system of claim 15, wherein the quality assurance value is further based, at least in part, on providing additional inputs to the neural network, wherein the additional inputs include (i) one or more overall ratings associated with the one or more consumer-based reviews, (ii) the one or more respective individual ratings for the identified one or more individual components, and (iii) a quality of feedback value relating to the one or more consumer-based reviews.

17. The computer system of claim 15, the stored program instructions further comprising
program instructions to receive a review request relating to a commercial product or service the user wishes to purchase;
program instructions to identify: (i) the commercial product or commercial service associated with the review request, and (ii) the one or more individual components of the commercial product or commercial service associated with the review request; and
program instructions to determine one or more similar commercial products or services to the commercial product or service the user wishes to purchase.

18. The computer system of claim 17, wherein the determining of the one or more similar commercial products or services to the commercial product or service the user wishes to purchase is based, at least in part, on: (i) the one or more individual ratings of the individual components of the commercial product or service the user wishes to purchase, (ii) an overall rating of the commercial product or commercial service the user wishes to purchase, (iii) one or more individual ratings of individual components of the similar commercial products or services, and (iv) an overall rating of the similar commercial products or services.

19. The computer system of claim 18, wherein the digital recommendation represents a UI and includes: (i) an overall rating associated with a commercial product or service identified in a review request, (ii) individual ratings of the one or more individual components the commercial product or service identified in the review request, (iii) overall ratings associated with similar commercial products or services to the commercial product or service identified in the review request, and (iv) individual ratings of one or more individual components associated with the similar commercial products or services.

20. The computer system of claim 15, the stored program instructions further comprising:
program instructions to calculate an average rating associated with the commercial product or service based, at least in part, on: (i) an overall rating of the commercial product and/or service, (ii) respective individual ratings of one or more individual components of the commercial product and/or service, and (iii) quality of received feedback associated with the one or more consumer-based reviews;
program instructions to generate a commercial evaluation based, at least in part, on the calculated average rating; and
program instructions to communicate the commercial evaluation to a business entity.

* * * * *